United States Patent [19]

Putz et al.

[11] 4,184,983

[45] Jan. 22, 1980

[54] FILTER MATERIAL FOR REMOVAL OF OZONE FROM THE ATMOSPHERE

[75] Inventors: Patricia J. Putz, Highwood; Marie A. Lishka, Mt. Prospect; Edwin J. Latos, Chicago, all of Ill.

[73] Assignee: UOP Inc., Des Plaines, Ill.

[21] Appl. No.: 888,049

[22] Filed: Mar. 17, 1978

[51] Int. Cl.$^2$ .................. B01J 21/04; B01J 23/42; B01J 23/46
[52] U.S. Cl. .................. 252/466 PT; 252/472; 423/210
[58] Field of Search .............. 252/472, 463, 466 PT; 423/210 S

[56] References Cited

U.S. PATENT DOCUMENTS

| | | | |
|---|---|---|---|
| 2,298,607 | 10/1942 | Anderson | 423/210 S |
| 3,259,453 | 7/1966 | Stiles | 423/213.2 |
| 3,682,585 | 8/1972 | Frevel et al. | 423/210 S |
| 3,741,725 | 6/1973 | Graham | 252/466 PT |

*Primary Examiner*—W. J. Shine
*Attorney, Agent, or Firm*—James R. Hoatson, Jr.; Raymond H. Nelson; William H. Page, II

[57] ABSTRACT

Ozone, which may be an irritating factor present in the atmosphere, may be removed therefrom by utilizing, as a filter material, in masks a material comprising at least one metal or metal oxide selected from Group VIII of the Periodic Table, a carbonaceous pyropolymer or combinations thereof composited on a solid support such as an alumina.

6 Claims, No Drawings

FILTER MATERIAL FOR REMOVAL OF OZONE FROM THE ATMOSPHERE

BACKGROUND OF THE INVENTION

Ozone, which is found in the atmosphere of the earth, may, in low levels of concentrations such as 0.05 to 0.10 ppm, cause sensory irritation in humans and higher concentrations such as from about 0.20 to about 2.0 ppm may cause severe reactions such as impaired respiration, chest pains, extreme fatigue, as well as chronic coughing. Although natural levels of ozone may range from about 0.01 to about 0.03 ppm or less, it is becoming increasingly concentrated in cases of air pollution. This is especially true in specific situations where air circulation is limited, for example, near high voltage electrical equipment, ultraviolet sources, during arc welding operations, and, in recent instances, where ozone sickness has occurred to passengers and crew members in aircraft which are flying at relatively high altitudes. The aircraft, in normal situations, usually attempt to fly at relatively high altitudes in order to conserve fuel. However, the ozone layer which is normally present in the upper atmosphere has been found to be coming closer to the earth and, therefore, high ozone levels have been found in aircraft which are flying at elevations in excess of 35,000 feet. The ozone sickness which may occur in these aircraft is potentially dangerous inasmuch as the members of the crew who are flying the aircraft may be subjected to the reactions hereinbefore set forth, such as impaired respiration, chest pains, etc.

Currently, activated charcoal is being used in the aircraft in an attempt to eliminate the ozone. However, the amount of activated charcoal which is required is relatively large, i.e., 400 pounds or more, and it is therefore necessary to find some substitute material which will act as a filter to effectively remove the ozone from the atmosphere in the aircraft utilizing some material which will require a substantially smaller amount with a concurrent drop in the amount of weight.

In the past, a variety of substances have been used to decompose ozone to molecular oxygen including charcoal, glass, plastics, wood, natural or synthetic rubber, or some chemicals which are also sacrificial agents and will form compounds with ozone such as carbon monoxide, carbon dioxide, or the metal oxides of nickel, copper, iron, etc.

One method of removing ozone from the atmosphere which is breathed would be to utilize a face mask or air stream filter, said face mask containing a refillable cartridge which contains a catalyst capable of decomposing the ozone. While natural latex, synthetic rubber, or similar highly unsaturated organic materials may be used, it would mean that after the ozone had reacted with the material the latter would become spent and, therefore, would have to be disposed of. In contradistinction to this, it would be advantageous to utilize a catalytic material which would not lose its efficiency and thus would be usable for a relatively long period of time. Therefore, the criteria for a catalytic material which would be used to decompose ozone would be that it would have to possess a long life, be susceptible to reactivation and in addition would possess the ability to decompose the ozone passing through the filter without releasing any fine particulate matter or produce any undesirable side reactions.

As will hereinafter be shown in greater detail, it has now been discovered that a filter material which is effective in decomposing ozone has been discovered and comprises at least one metal, metal oxide, carbonaceous pyropolymer or combinations thereof composited on a solid support.

This invention relates to a filter material which may be utilized for the decomposition of ozone. More specifically, the invention is concerned with a filter material which possesses the ability to decompose ozone and comprise at least one metal, metal oxide, carbonaceous pyropolymer or combinations thereof composited on a solid support of a type hereinafter set forth in greater detail.

It is, therefore, an object of this invention to provide a filter material for the decomposition of ozone which possesses a long period of activity without the necessity for reactivation.

A further object of this invention is to provide a filter material comprising at least one metal, metal oxide, or carbonaceous pyropolymer or combinations thereof composited on a solid support which possesses the ability to decompose ozone from the atmosphere without the release of particulate matter.

In one aspect an embodiment of this invention resides in a filter material for the removal of ozone from the atmosphere which comprises at least one catalytic metal, metal oxide, carbonaceous pyropolymer or combinations thereof composited on a solid support.

A specific embodiment of this invention is found in a filter material for the removal of ozone from the atmosphere which comprises a combination of platinum and rhodium composited on an alumina having a surface area of from about 10 to about 500 m$^2$/g.

Other objects and embodiments will be found in the following detailed description of the present invention.

As hereinbefore set forth in the present invention is concerned with a filter material which possesses the ability to remove ozone from the atmosphere. This material comprises at least one catalytic metal, metal oxide, carbonaceous pyropolymer or combinations thereof composited on a solid support. In the preferred embodiment of the invention the catalytic metals or metal oxides comprise those in which the metal is selected from Group VIII of the Periodic Table and moe particularly the noble metals of Group VIII. Examples of these metals which may be utilized as catalysts will include platinum, palladium, ruthenium, rhodium, osmium, and iridium, as well as combinations thereof such as platinum-ruthenium, palladium-ruthenium, platinum-rhodium, palladium-rhodium, etc., as well as the corresponding oxides.

The aforesaid metals or metal oxides are composited on a solid support which, in a preferred embodiment of the invention, comprises a refractory inorganic oxide which possesses a surface area ranging from about 10 to about 500 m$^2$/g. Specific examples of these refractory inorganic oxides will include various forms of alumina and particularly alpha-, gamma-, theta-, or eta-alumina, silica, or mixtures such as silica-alumina. The catalytic metal will be present on the solid support in a range of from about 0.01 to about 1.0% by weight of metal.

The catalytic filter material may be prepared according to any method known in the art. For example, the solid support comprising an inorganic oxide of the type hereinbefore set forth may be in any shape such as particles, spheres, beads, monoliths, etc. In one method of preparing the filter material the solid support or carrier material is impregnated with a solution, and preferably an aqueous solution of a soluble compound of the catalytic component, the concentration of said solution being sufficient to insure the presence of at least about 0.01% of the metal component in the finished catalyst. Compounds of metals of the platinum group which may be utilized to impregnate the solid support will include chloropalladic acid, chloroplatinic acid, ammonium chloropalladinate, palladinous chloride, palladinic chloride, platinous chloride, platinic chloride, the corresponding ruthenium, rhodium, osmium and iridium compounds. The catalytic impregnation may be carried out, if so desired, in the presence of an additive component such as, for example, thiomalic acid which will aid the impregnation of the catalyst support.

As hereinbefore set forth the catalyst support may be in any form desired prior to impregnation of the catalytic component thereon and may be manufactured by any method known in the art. For example, spheroidal inorganic oxide particles may be manufactured by dispersing an inorganic oxide hydrosol in the form of droplets into a suitable gelling medium and immediately thereafter subjecting the resulting hydrogel spheres to a particular series of aging treatments in a basic medium. The gelling medium which is employed in this process may be any suitable water-immiscible suspending liquid such as a light gas oil which is chosen principally for its high interfacial tension with respect to water. When utilizing an inorganic oxide such as alumina, it is preferred to utilize a weak base with specific properties such as hexamethylenetetramine in the gelation medium.

Another method of preparing the solid support for the catalytic component of the filter material is to form a paste or dough of the support followed by extrusion thereof utilizing a cnventional screw type of extrudator. The dough or paste is processed through this extrudator following which the freshly extruded material may be collected in the form of strands of indefinite or random lengths which are then dried and subsequently broken into extrudate particles. Alternatively, the freshly extruded material may be cut into random or predetermined lengths and subsequently dried or, if so desired, the freshly extruded material may be formed into spheres, for example, by the process whereby the extrudate strands are collected in a spinning drum, the strands becoming segmented and spheroidized under the spinning influence of the drum. Following this, the extrudate is dried and calcined at elevated temperatures to produce the desired solid support.

Another type of solid support which may be utilized for the filter material of the present invention comprises a refractory inorganic oxide containing at least a monolayer of a carbonaceous pyropolymer which contains recurring carbon and hydrogen atoms on the surface thereof. One method of preparing this type of support is to impregnate a suitable refractory inorganic oxide including various forms of alumina such as alpha-alumina, beta-alumina, gamma-alumina, eta-alumina, silica, magnesia, zirconia, titania, or mixtures thereof such as silica-alumina, silica-magnesia, silica-zirconia, silica-alumina-zirconia, silica-alumina-magnesia, silica-alumina-titania, etc., the preferred oxide or mixture of oxides being one which possesses a relatively large surface area such as gamma-alumina or silica-alumina. The suitable refractory inorganic oxide is impregnated by admixing a solution containing a carbohydrate with said oxide. The carbohydrates which are employed are preferably those which are soluble in certain solvents at reasonable temperatures, the preferred solvent comprising water, although it is also contemplated that other solvents including low molecular weight alcohols such as methyl alcohol, ethyl alcohol, n-propyl alcohol, isopropyl alcohol, etc., or aqueous solutions of these lower molecular weight alcohols may also be employed. One criterion of the solvents which is to be employed is that the boiling point of said solvent be lower than the decomposition temperature of the carbohydrate which is to be pyrolyzed. The solubility of the carbohydrates in the particular vehicle or solvent which is to be employed will permit a sufficient penetration of the solution into discrete particles of the refractory substrate. The impregnation or the mixing of the carbohydrate solution with the refractory inorganic oxide is usually effected at atmospheric pressure and ambient temperature for a period of time sufficient to permit complete impregnation, the residence time usually ranging from about 0.1 up to about 4 hours or more.

Appropriate precursors for the carbonaceous pyropolymers will comprise a variety of carbohydrates including monosaccharides, disaccharides, polysaccharides, etc., some specific examples of these compounds being the monosaccharides such as erythrose, threose, ribose, arabinose, lyxose, xylose, altrose, mannose, galactose, gulose, allose, glucose (dextrose), talose, idose, fructose, tagatose, sorbose, rhamnose, etc.; disaccharides such as sucrose, trehalose, etc.; trisaccharides such as gentianose, raffinose, melezitose, etc.; polysaccharides such as glycogen, inulin, dextrin, starch, cellulose, other pectic materials, plant carbohydrate gums, etc.

The refractory inorganic oxide which has been impregnated with the carbohydrate solution is then dried at a temperature in the range of from about 110° to about 150° C. for a period of time ranging from about 2 to about 10 hours or more in duration. Following this, the dried, impregnated oxide is then pyrolyzed at an elevated temperature ranging from about 600° to about 1200° C. at atmospheric pressure and preferably in an inert atmosphere which is supplied by effecting the calcination in a dry nitrogen atmosphere, said calcination being effected for a period of time ranging from about 0.5 up to about 4 hours or more. The resulting material is then impregnated with a solution of the catalytic metal in a manner similar to that hereinbefore set forth in order to obtain the desired filter material.

Another method of preparing the filter material of the present invention also involves using a refractory inorganic oxide containing at least a monolayer of a carbonaceous pyropolymer on the surface thereof which has been prepared by subjecting the inorganic refractory oxide which may be in any form such as loose dry powders, flats, cylinders, spheres, rods, pellets, etc., to a pyrolysis process in which a carbonaceous pyropolymer precursor is passed over the surface of the inorganic refractory oxide at pyrolysis conditions which range from about 600° to about 1200° C. or more. Examples of organic substances which may be pyrolyzed to form the carbonaceous pyropolymer of the surface of the refractory oxide will include aliphatic hydrocarbons such as ethane, propane, butane, pentane, etc.; cycloaliphatic hydrocarbons such as cyclohexane, methylcyclopentane, etc.; aromatic hydrocarbons such as benzene, toluene, the isomeric xylenes, naphthalenes, etc.; aliphatic halogen derivatives such as chloromethane, bromoethane, chloroethane, bromopropane, chlorobutane, carbon tetrachloride, chloroform, 1,2-dichloroethane, etc.; aliphatic oxygen derivatives such as ethyl alcohol, n-propyl alcohol, isopropyl alcohol, glycol, glycerol, ethyl ether, etc.; aliphatic sulfur derivatives such as ethyl mercaptan, n-propyl mercaptan, butyl mercaptan, etc.; aliphatic nitrogen derivatives such as dimethylamine, diethylamine, acetamide, propionamide, nitroethane, 1-nitrobutane, acetonitrile, propionitrile, etc.; heterocyclic compounds such as furan, furfural, pyran, etc. The solid support is obtained by placing a charge of the inorganic refractory oxide such as gamma-alumina, silica-alumina, etc., in an appropriate vessel which is thereafter heated to the desired pyrolysis temperature. The pyropolymer precursor is charged to the vessel and passed over the surface of the refractory inorganic oxide and is deposited there in at least a monolayer of carbonaceous pyropolymer containing recurring carbon and hydrogen atoms. Following the recovery the support is then treated in a manner similar to that set forth in order to deposit the catalytic metal on the surface thereof.

The filter materials hereinbefore described may be utilized as filters for home or industrial air conditioning systems or in portable face masks. For example, when being utilized in portable face masks the filter material may be enclosed in a container constructed of either porous material or screening whereby the atmosphere which is to be breathed can readily pass through the container and over the surface of the catalytic filter material thereby decomposing the ozone and permitting molecular oxygen to be inhaled by the person wearing the face mask rather than the ozone. It is to be realized that any particular configuration of the filter container which is known in the art may be used and that the amount of catalytic filter material will vary of a relatively wide range, the smallest amount of material being that which is sufficient to decompose ozone for a predetermined period of time. As hereinbefore set forth, by utilizing the catalytic metal on a solid support of the type described it is possible to obtain a filter material which will effectively decompose the ozone without releasing any finely divided particulate material into the air.

The following examples are given for purposes of illustrating the operability of the catalytic filter material of the present invention in the decomposition of ozone. However, it is to be understood that these examples are given merely for purposes of illustration and that the present invention is not necessarily limited thereto.

EXAMPLE I

To generate the ozone required for the test, air was treated with a mercury vapor lamp to generate ozone in an ozone test chamber. The ozone test chamber which was used possessed both sufficient internal circulation and internal volume mode to assure the complete admixing of ozone and air. In the chamber the ozone concentration was usually between 0.4 and 0.55 ppm. A sample of the ozone air mixture was pulled from the test chamber by vacuum at a rate of 3.35 liters/min. and passed through a reactor vessel containing the filter material and into an ozone detector. The ozone was detected utilizing a modified spray jet method (ASTM D 1149-64). A null indicator was used to detect an increase in current and at the beginning of a run the indicator was placed at one mark and the time necessary for it to reach the next mark was noted. The time for apparent 100% conversion of ozone to oxygen has been defined as the time during which enough ozone is removed or decomposed for the ozone/air stream to produce no movement in the null indicator or just enough to move the indicator one unit. Various types of catalysts which are hereinafter described in greater detail were placed in the reactor vessel and the ability of the various filters to decompose ozone was noted.

EXAMPLE II

To test the efficiency of certain metals or metal oxides, a solid support was prepared by mixing 9 kg of alumina with 5950 ml of a solution containing 5% aluminum nitrate. In addition, the mixture contained 0.1% carbon black and 0.25% detergent. The resulting mixture was extruded through a plate having an orifice 2.88 mm in diameter, following which the mixture was then calcined at a temperature of 650° C. for a period of 2 hours.

To form a filter material, 10 grams of the support prepared according to the above paragraph were added to a mixture of 0.505 grams of nickel nitrate in 10 ml of deionized water and allowed to stand for a period of 45 minutes. Thereafter the filter material was heated in a muffle furnace at a temperature of 500° C. for a period of 2 hours. The filter material was then placed in a reactor vessel in an amount of 3 grams following which ozone was passed through the reactor vessel at a gas hourly space velocity of about 43,000. In addition, two other filter materials were prepared in a similar manner by admixing 10 grams of the solid support with a solution of 0.38 grams of copper nitrate in 10 ml of deionized water and adding 10 grams of the solid support to a mixture of 0.68 grams of ferric ammonium citrate (21% $Fe_2O_3$) in 10 ml of deionized water. The impregnated support was allowed to stand for a period of 45 minutes followed by heating in a muffle furnace at a temperature of 500° C. for a period of 2 hours. The results of the three tests are set forth in Table I below.

TABLE I

| Type of Filter Material | Weight of Sample (g) | Gas Hourly Space Velocity (Calculated from ABD) | Time for Apparent 100% Conversion (Min.) | % Conversion (After Apparent 100% Conv.) |
|---|---|---|---|---|
| $NiO/Al_2O_3$ | 3.0 | 43,000 | 90 | 66.8 |
| $CuO/Al_2O_3$ | 3.0 | 43,000 | 30 | 26.5 |
| $Fe_2O_3/Al_2O_3$ | 3.0 | 43,000 | 45 | 38.4 |

A similar test utilizing only the solid support with the similar gas hourly space velocity and weight of sample showed a 30 minute time for apparent 100% conversion with a 30.2% conversion.

EXAMPLE III

In this example a solid support was prepared from 3 kg of alumina, 30 grams of Antarax 240 (a modified linear aliphatic polyether surfactant sold by GAF Corp.) and 3 grams of carbon black mixed with 1950 ml of a solution containing 180 grams of aluminum nitrate. The latter was extruded through a 2.5 mm plate and cut into pills. Following this the latter was calcined at a temperature of 650° C. for a period of 2 hours and preshrunk by heating to a temperature of 1038° C. for an additional period of 2 hours. The thus prepared solid support was then impregnated with a solution containing 0.208 grams of palladium/liter and 0.522 grams of platinum/liter, said solution also containing thiomalic acid and after drying the final filter material contained 0.085 wt. % of platinum and 0.033 wt. % palladium. Three separate samples of this filter material was used in the ozone test; sample A comprising 3.0 grams of material, sample B comprising 2.0 grams, and sample C comprising 1.0 grams of material. The three samples were tested in a reactor vessel utilizing a stream of ozone similar to that set forth in Example I above. The results of these tests are set forth in Table II below.

TABLE II

| Sample | Gas Hourly Space Velocity | Time for Apparent 100% Conversion (Min.) | % Conversion |
|---|---|---|---|
| A | 50,000 | 822 | 82.9 |
| B | 100,000 | 337 | 90.3 |
| C | 151,000 | 85 | 67.05 |

It is readily apparent from a comparison of the results set forth in Table I and Table II that the filter material which is described in the present invention exhibited superior results (Table II) when contrasted to the other metal oxides used in Example II (Table I), the noble metal impregnated on the solid support being 9 times more effective than the nickel oxide catalyst, 27 times more effective than the copper oxide catalyst and about 18 times more effective than the ferric oxide-solid support material when utilizing comparable loadings of filter material. Likewise, when using only 2 grams of the noble metal-solid support filter material of the present invention, it was found that it was almost 4 times as effective as the higher loaded nickel oxide, 11 times more effective than the higher loaded copper oxide, and over 7 times more effective than the higher loaded ferric oxide filter material.

EXAMPLE IV

To simulate more closely the atmospheric environment of aircraft which are operating at relatively high altitudes, a series of experiments were performed in which a drierite filter was added to the incoming air line of the ozone cabinet. The ozone level in the cabinet was raised to give a concentration of approximately 1 ppm. Filter materials were prepared in a manner similar to that set forth in the above examples. The first filter material comprises an alumina monolith which was ⅞" in diameter and ¼" thick. The monolith was impregnated with a sufficient amount of soluble salts of platinum and rhodium to give a final loading, after drying of the material, a concentration of 0.96% platinum and 0.11% rhodium. The filter material as placed in the reactor vessel and subjected to the action of the ozone/air mixture at a gas hourly space velocity of 20,000. After 30 minutes the filter material exhibited a 36% conversion. A second filter material comprising 0.18% platinum and 0.02% rhodium impregnated on alumina spheres of ⅛" diameter were tested utilizing the same ozone/air feed at a gas hourly space velocity of 42,000. After 30 minutes the filter material exhibited a 98% conversion of the ozone. In like manner, a third filter material which was prepared by impregnating gamma-alumina with a dextrose solution, dried and calcined at a temperature of about 710° C. for a period of about 2 hours. The refractory inorganic oxide containing at least a monolayer of the carbonaceous pyropolymer on the surface thereof was utilized as the filter material and subjected to the action of the ozone/air mixture at a gas hourly space velocity of 65,000. After a period of 160 minutes the filter material exhibited a greater than 98% conversion of the ozone.

We claim as our invention:

1. A filter material for the removal of ozone from the atmosphere which comprises a combination of platinum and rhodium metal and a carbonaceous pyropolymer composited on a solid support.

2. The material of claim 1 in which said solid support is an inorganic metal oxide.

3. The material as set forth in claim 2 in which said inorganic metal oxide is alumina having a surface area of from about 10 to about 500 m$^2$/g.

4. The material as set forth in claim 3 in which said alumina is gamma-alumina.

5. The material as set forth in claim 1 in which said solid support is a high surface area refractory inorganic oxide containing at least a monolayer of said carbonaceous pyropolymer on the surface thereof.

6. The material as set forth in claim 5 in which said refractory inorganic oxide is gamma-alumina.

* * * * *